United States Patent [19]

Van Moer et al.

[11] Patent Number: 5,122,306

[45] Date of Patent: Jun. 16, 1992

[54] CHEMILUMINESCENT SOLUTION BASED ON SUBSTITUTED PERYLENE

[75] Inventors: Andre Van Moer, Waterloo; Jacques Ladyjensky, Brussels, both of Belgium

[73] Assignee: American Cyanamid Company, Stamford, Conn.

[21] Appl. No.: 540,073

[22] Filed: Jun. 19, 1990

[30] Foreign Application Priority Data

Jun. 20, 1989 [BE] Belgium ............................... 0890062

[51] Int. Cl.$^5$ ........................... C09K 3/00; F21V 9/00; F21V 9/04; C07D 221/22
[52] U.S. Cl. ................................... 252/700; 252/582; 252/587; 546/37
[58] Field of Search ................. 252/700, 582, 587; 546/37

[56] References Cited

U.S. PATENT DOCUMENTS

| 3,325,417 | 6/1967 | Rauhut | 252/700 |
| 4,379,320 | 4/1983 | Mohan et al. | 252/700 |
| 4,462,931 | 7/1984 | Cohen et al. | 252/700 |
| 4,678,608 | 7/1987 | Dugliss | 252/700 |
| 4,698,183 | 10/1987 | Koroscil | 252/700 |
| 4,717,511 | 6/1988 | Koroscil | 252/700 |
| 4,845,223 | 7/1989 | Seybold et al. | 546/37 |

Primary Examiner—Robert L. Stoll
Assistant Examiner—Philip Tucker
Attorney, Agent, or Firm—Frank M. Van Riet

[57] ABSTRACT

Compositions adapted to be reacted with hydrogen peroxide to provide chemiluminescent light are disclosed wherein the fluorescer is a perylene derivative.

14 Claims, No Drawings

CHEMILUMINESCENT SOLUTION BASED ON SUBSTITUTED PERYLENE

BACKGROUND OF THE INVENTION

The present invention relates to the production of light by chemiluminescence and, more particularly, the use of specific fluorescent agents for this purpose.

The principle and the techniques for the production of chemiluminescent light are described in detail in U.S. Pat. No. 4,678,608 which is incorporated in the present description as a reference.

Chemiluminescence is produced by a reaction in the liquid phase of an activator such as hydrogen peroxide with a fluorescent agent and an oxalate. Optionally, other secondary compounds can be present In general, they are also fluorescent agents, which modify the characteristics of the emitted light.

Until now, there exits no simple means to produce red chemiluminescent light which is satisfactory for the users, although there has been a report on the use of derivatives of naphthacenes and tetracenes as auxiliary fluorescent agents to produce red chemiluminescence Thus, U.S. Pat. No. 3,557,233 cites the use of 5,12-bis(-phenylethynyl)naphthacene, pentacene and 6,13-bis(-phenylethynyl)pentacene as a fluorescent agent to produce fluorescence at a wavelength of 578, 578 and 690 nanaometes, respectively. Nevertheless, these compounds were shown to be unstable in the reaction and the duration of the chemiluminescence obtained in this manner is too short to be of commercial interest.

However, on the market side, there exists a significant demand for red chemiluminescent light. Red is a color which is greatly appreciated by the public at large and, in addition, under several circumstances where chemiluminescence is applied for safety and rescue purposes, the color red is imperatively required because of traditions or conventions.

Because there is no commercially usable red chemiluminescent liquid, U.S. Pat. No. 4,379,320 has proposed a method which consists in using a non-red chemiluminescent liquid, whose luminosity is satisfactory both with regard to intensity as well as duration, and to use it in a container whose translucent walls are dyed in the composition by a red fluorescent dye. The claimed chemiluminescent liquid emits wavelength which is lower than that of the dye of the wall. Thus, the color is yellow is cited preferentially. Some articles based on this principle are in fact commercially available on a large scale; however, the drawback that is mentioned is that it produces a red-orange color and not a true pure red color, the latter could be designated as "signal red" with an emission which would be at a wavelength of approximately 625 nanometers.

It has now been observed unexpectedly that known fluorescent dyes which are soluble in organic solvents and, particularly, esters, can be used advantageously to produce a chemiluminescent light, particularly a red chemiluminescent light, which is particularly appreciated by the users and which differs from the colors produced in the prior art.

DESCRIPTION OF THE INVENTION INCLUDING PREFERRED EMBODIMENTS

The present invention relates to a composition adapted to be reacted with hydrogen peroxide to provide chemiluminescent light, said composition containing a compound having the formula:

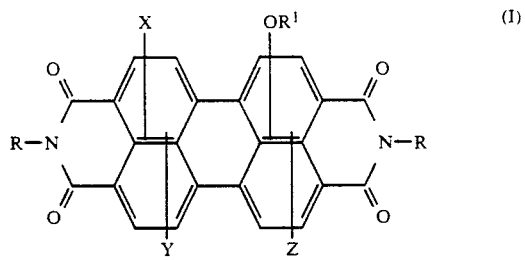

wherein each R, individually, is substituted or unsubstituted aliphatic, aromatic or heterocyclic radical, X, Y, and Z are, individually, chlorine fluorine, bromine or $OR^1$ and $R^1$ is a substituted or unsubstituted phenyl, the amount of said compound being such as to provide visible light, said phenyl substituents being, for example, alkyl, substituted alkyl, halo etc.

Preferably, the compounds represented by Formula I, above, are those wherein each R, individually, is a

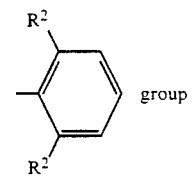

wherein each $R^2$, individually, is a straight chain alkyl group of at least 2 carbon atoms, such as ethyl, n-propyl, n-butyl and the like.

More preferably, the compounds represented by Formula I, above, are those wherein each R, individually, is 1) a phenyl group containing, in the ortho position, a branched alkyl group having at least 3 carbon atoms or 2) a neopentyl group. Suitable substituents include 2-isopropylphenyl; 2-isobutylphenyl; 2-isopentylphenyl etc.

Even more perferably, the compounds represented by Formula I, above, are those wherein each R, individually, is a

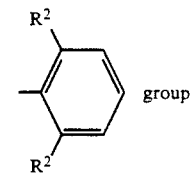

wherein $R^2$ is a branched, alkyl group of at least 2 carbon atoms, such as those described above.

Most preferably, the fluorescent dyes according to the invention are substituted dicarboximide perylenes with general formula:

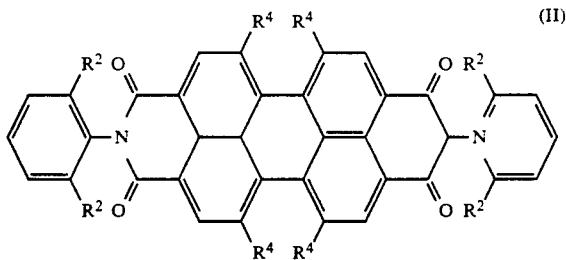

where substituents $R^2$, are branched alkyl groups of at least 3 carbon atoms, as described above, and groups $R^4$, which may be different or identical, represent phenoxy or substituted phenoxy groups.

The substituted phenoxy groups $R^4$ can be, for example, halophenoxy i.e. p-bromophenoxy, p- or o-chlorophenoxy, p- or o-fluorophenoxy or alkylphenoxy e.g. p-t-butylphenoxy. $R^2$ is preferably isopropyl.

The preferred fluorescent dye is 1,6,7,12-tetraphenoxy-N-N'-bis(2,6-diisopropylphenyl)-3,4,9, 10-perylene dicarboximide which corresponds to the above Formula (II) with $R^2$ being isopropyl and $R^4$ phenoxy.

The above-mentioned compounds are described in European Patent Application No. 227,980 and U.S. Pat. No. 4,845,223. The preferred compound is used under the trade name Lumogen F Rot 200 as a fluorescent dye in plastic materials with light-concentration effects. These patents also describe the preparation of analog derivatives.

Some dicarboximide perylenes have already been used for the production of chemiluminescent light. Thus, Pat. No. 4,678,608 claims the use of dyes of this family, not particularly substituted in position 1, 6, 7, or 12. These derivatives are however used in association with another fluorescent compound. The association can produce advantageously a white color, which is difficult to produce otherwise, or other colors, but different from red.

To produce chemiluminescent light, the compounds according to the present invention are used under the conditions already described in the literature, particularly in said U.S. Pat. No. 4,678,608. In general, one can use any known solvent or oxalate which can be used for the production of chemiluminescent light. The solvent can be an ester, aromatic derivatives or a chlorinated hdyrocarbon. Preferably, phthalates are used, in particular dibutyl phthalate.

Oxalate, such as those described in U.S. Pat. Nos. 3,749,679 and 3,846,316, incorporated herein by reference, may be used to produce the chemical reaction to cause chemiluminescent light when mixed with the fluorescers described above, with bis(2,4,5-trichloro-6-carbopentoxylphenyl) oxalate being exemplary. Substituted carbalkoxyphenyl oxalate are the preferred class of oxalates used herein the oxalate and perylene fluorescer each being used in sufficient quantity to cause chemiluminescent light, preferably in a 20–40:1 oxalate to fluorescer, molar ratio.

The perylene fluorescer is used in amounts ranging from about 0.005 mole per liter of oxalate solution i.e. the solvent solution of the oxalate and the perylene fluorescer.

Useful catalysts are disclosed in U.S. Pat. No. 3,775,336, incorporated herein by reference, in concentrations disclosed therein, and usually in the solvent solution of the hydrogen peroxide.

The areas of application are well known and they include the production of useful objects, particularly signs, decorative objects, games and gadgets such as chemiluminescent colors, etc... In such articles, the chemiluminescent light is produced by mixing a solution of an activator, in general oxygenated water (hydrogen peroxide), with a solution which contains the derivatives of perylene and an oxalate diester. The article consists of, in its passive state, two compartments between which a communicating link was established at the time of use, for example as described in *French Pat. No.* 87 11296, for the case of flexible luminescent tubes.

The following example will illustrate the invention without limiting it.

EXAMPLE 1

To a liter of dibutyl phthalate, heated to 150° C. and purged with nitrogen, one adds 110 g of bis(2,4,5-trichloro-6-carbopentoxylphenyl) oxalate and 1 part of 1,6,7,12-tetraphenoxy-N-N'-bis(2,6-diisopropylphenyl)-3,4,9.10-perylene dicarboximide, by continuing the mixing until dissolution is completed.

In addition, one prepares a mixture of 80 parts by volume of dimethyl phthalate and 20 parts of t-butanol, in which one dissolves 50 g of hydrogen peroxide and 25 mg of sodium salicylate. This solution constitutes the activator.

To produce the chemiluminescence, one mixes one part by volume of the activator and 3 parts of the colored solution in a container with translucent walls.

One compares the chemiluminescence emitted by such a mixture to the chemiluminescence emitted by a commercial cylinder ("Cyalume ®) red manufactured by American Cyanamid) which contains a chemiluminescent solution which emits in the yellow range and whose translucent cylinder walls are colored composition by a red fluorescent dye. The cylinder is activating by breaking a glass ampule which floats in the colored liquid and which is filled with the activator solution.

One observes that, in the case of the Cyalume ® article, the initial luminous intensity is, in a first step, higher than that produced according to the present invention. after approximately three hours, the luminosities are equivalent; subsequently, the system according to the invention produces a more intense light. During the entire test duration, the light emitted according to the invention is comparable to the wanted red "signal" light and not to a red-orange as produced by the above-mentioned commercially available article.

EXAMPLES 2–10

The procedure of Example 1 is again followed except that the 1,6,7,12-tetraphenoxy-N,N$^1$-bis(2,6-diisopropyl-phenyl)-3,4,9,10-perylene dicarboximide is replaced by other perylene compounds according to the generic formulae above. In each instance, a red chemiluminescent light is produced in the absence of any other fluorescer in the solution or in the walls of the container.

Example 2. 1,7-dichloro-6, 12-diphenoxy-N,N$^1$-bis(2,6-diisopropylphenyl)-3,4,9,10-perylene dicarboximide.

Example 3 1,6,7,12-tetra(p-bromophenoxy)-N,N$^1$-bis(2,6-diisopropylphenyl)-3,4,9,10-perylene dicarboximide.

Example 4. 1,6,7,12-tetraphenoxy-N,N$^1$-dineopentyl-3,4,9,10-perylene dicarboximide.

Example 5. 1,6,7,12-tetra(p-t-butylphenoxy)-N,N$^1$-dineopentyl-3,4,9,10-perylene dicarboximide.

Example 6. 1,6,7,12-tetra(o-chlorophenoxy)-N,N$^1$-bis(2,6-diisopropylphenyl)-3,4,9.10-perylene dicarboximide.

Example 7 1,6,7,12-tetra(p-fluorophenoxy)-N,N$^1$bis(2,6-diisopropylphenyl)-3,4,9,10-perylene dicarboximide.

Example 8. 1,6,7,12-tetra(p-fluorophenoxy)-N,N$^1$-bis(2,6-diisopropylphenyl)-3,4,9,10-perylene dicarboximide.

Example 9. 1,6,7,12-tetra(p-chlorophenoxy)-N,N$^1$-bis(2,6-diisopropylphenyl)-3,4,9,10-perylene dicarboximide.

Example 10. 1,6,7,12-tetra(p-t-butylphenoxy)-N,N$^1$dineopentyl-3,4,9,10-perylene dicarboximide.

Example 11. 1,6,7,12-tetraphenoxy-N,N$^1$-diethyl-3,4,9,10-perylene dicarboximide.

Example 12. 1,6,7,12-tetraphenoxy-N,N$^1$-bis (2,6-diethylphenyl)-3.4,9,10-perylene dicarboximide.

Example 13. 1,7,-dibromo-6,12-diphenoxy-N,N$^1$-bis-(2-isopropylphenyl)-3,4,9,10-perylene dicarboximide.

We claim:

1. A composition adapted to be reacted with hydrogen peroxide to provide chemiluminescent light, said composition containing a compound having the formula:

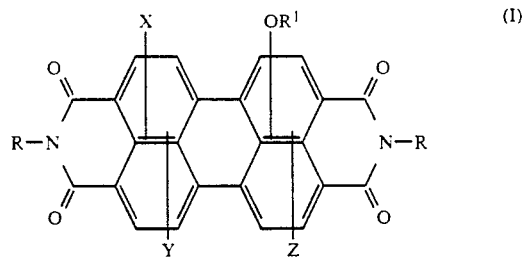

wherein each R is, individually, a substituted or unsubstituted $C_1$–$C_6$ alkyl or phenyl radical, X,Y, and Z are, individually, $OR^1$ and $R^1$ is a substituted or unsubstituted phenyl the substituents of said substituted radicals being $C_1$–$C_4$ alkyl, $C_1$–$C_4$ haloalkyl or halo, the amount of said compound being such as to provide visible light.

2. A composition according to claim 1 wherein R is an $C_1 + C_6$ alkyl radical.

3. A composition according to claim 1 wherein $R^1$ is a substituted phenyl.

4. A composition according to claim 1 wherein R is an phenyl radical and $R^1$ is a substituted phenyl.

5. A composition according to claim 1 wherein R is an phenyl radical, and $R^1$ is phenyl.

6. A composition according to claim 1 wherein R is 2,6-diisopropylphenyl, $R^1$ is phenyl.

7. A composition to according to claim 1 including, in addition thereto, an oxalate compound.

8. A composition according to claim 1 comprising, in addition thereto, a solvent for said compound 9. A composition according to claim 7 wherein said oxalate is a substituted carbalkoxyphenyl oxalate.

10. A composition according to claim 9 wherein said oxalate is bis(2,4,5-trichloro-6-carbopentoxylphenyl) oxalate.

11. A composition according to claim 8 wherein said solvent is t-butylphthalate.

12. A method of producing chemiluminescent light which comprises adding to the composition of claim 7 a solution of hydrogen peroxide.

13. A composition according to claim 1 wherein said compound is the only fluorescer is the composition.

14. A composition according to claim 1 wherein the chemiluminescent light is red.

* * * * *

UNITED STATES PATENT AND TRADEMARK OFFICE
CERTIFICATE OF CORRECTION

PATENT NO. : 5,122,306
DATED : June 16, 1992
INVENTOR(S) : Van Moer et al.

It is certified that error appears in the above-indentified patent and that said Letters Patent is hereby corrected as shown below:

Column 3, Formula II:  Replace the existing figure with the figure below:

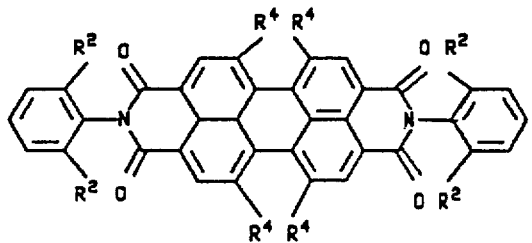

Signed and Sealed this

Nineteenth Day of April, 1994

Attest:

BRUCE LEHMAN

Attesting Officer        Commissioner of Patents and Trademarks